(12) United States Patent
Hwang et al.

(10) Patent No.: US 11,671,997 B2
(45) Date of Patent: Jun. 6, 2023

(54) WIRELESS LINK CONTROL BASED ON TIME AVERAGED SPECIFIC ABSORPTION RATE AND QUALITY OF SERVICE

(71) Applicant: Meta Platforms Technologies, LLC, Menlo Park, CA (US)

(72) Inventors: Insoo Hwang, Sammamish, WA (US); Qi Qu, Redmond, WA (US); Kyungho Kim, San Jose, CA (US); Jie Zhang, Newark, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 29 days.

(21) Appl. No.: 17/125,972

(22) Filed: Dec. 17, 2020

(65) Prior Publication Data

US 2022/0201693 A1    Jun. 23, 2022

(51) Int. Cl.
*H04W 28/02* (2009.01)
*H04W 72/08* (2009.01)
*H04W 72/54* (2023.01)

(52) U.S. Cl.
CPC ....... *H04W 72/54* (2023.01); *H04W 28/0268* (2013.01)

(58) Field of Classification Search
None
See application file for complete search history.

(56) References Cited

U.S. PATENT DOCUMENTS

2016/0127850 A1* 5/2016 Kao .................. H04W 4/70
                                                              370/328
2022/0159582 A1* 5/2022 Lu .................. H04W 52/36

\* cited by examiner

*Primary Examiner* — Hong Shao
(74) *Attorney, Agent, or Firm* — Foley & Lardner LLP

(57) ABSTRACT

Disclosed herein are related to a device controlling a wireless communication link based on an average amount of radiation exposure and quality of service (QoS). In one aspect, the device includes a processor configured to determine the QoS indicating a target performance of a communication link of a communication interface. In one aspect, the processor is configured to determine radio resource information of the communication link. In one aspect, the processor is configured to predict an amount of radiation exposure for a time period according to the QoS, the radio resource information, and the detected proximity of the user. In one aspect, the processor is configured to compare the predicted amount of radiation exposure for the time period against a time averaged threshold amount of radiation exposure. In one aspect, the processor is configured to allocate radio resources to the communication interface, according to the comparison.

20 Claims, 6 Drawing Sheets

WIRELESS LINK CONTROL BASED ON TIME AVERAGED SPECIFIC ABSORPTION RATE AND QUALITY OF SERVICE

FIELD OF DISCLOSURE

The present disclosure is generally related to control of wireless communication interfaces, including but not limited to control based on quality of service and/or energy absorption.

BACKGROUND

Developments in computing devices and communication devices have prompted growth in wearable technology. Wearable devices may integrate various components in a compact form, such that the wearable devices can be portable yet perform complex processes. For example, a wearable device may be a smart watch that may access content over the network, and may control or communicate with other computing devices, etc. For example, a wearable device may be a head mounted display (HMD) that may present artificial reality (e.g., virtual reality, augmented reality, mixed reality, etc.).

SUMMARY

Various embodiments disclosed herein are related to a device to control one or more communication links. In some embodiments, the device includes at least one communication interface (e.g., of one or more types of radios), and a sensor configured to detect a proximity (e.g., close distance or physical contact) of a user. In some embodiments, the device includes at least one processor coupled to the sensor. In some embodiments, the at least one processor is configured to determine a quality of service (QoS) indicating a target performance of a communication link of the at least one communication interface. In some embodiments, the at least one processor is configured to determine radio resource information (e.g., power headroom) of the at least one communication interface. In some embodiments, the at least one processor is configured to predict an amount of radiation exposure (e.g., via specification absorption rate) for a time period according to the QoS, the radio resource information, and/or the detected proximity of the user. In some embodiments, the at least one processor is configured to compare the predicted amount of radiation exposure for the time period against a time averaged threshold amount of radiation exposure. In some embodiments, the at least one processor is configured to allocate radio resources to (e.g., between or across) the at least one communication interface, according to the comparison. According to the allocated radio resources, the device may cause or configure the at least one communication interface to establish the communication link.

In some embodiments, the at least one processor is configured to allocate a first amount of radio resources to the at least one communication interface, if the predicted amount of radiation exposure is above the time averaged threshold amount of radiation exposure. In some embodiments, the at least one processor is configured to allocate a second amount of radio resources higher than the first amount of radio resources, to the at least one communication interface, if the predicted amount of radiation exposure is less than the time averaged threshold amount of radiation exposure.

In some embodiments, the at least one communication interface includes a first communication interface and a second communication interface. In some embodiments, the at least one processor is configured to increase a portion of the radio resources to allocate to the first communication interface to satisfy a first QoS of the first communication interface that is higher than a second QoS of the second communication interface. In some embodiments, the at least one processor is configured to decrease a portion of the radio resources to allocate to the second communication interface. In some embodiments, the radio resource information includes at least one of: a power headroom, a power level of power source (e.g., remaining energy level in a battery) or a frequency band of the at least one communication interface.

In some embodiments, the at least one communication interface includes a first communication interface and a second communication interface. In some embodiments, the at least one processor is configured to decrease a portion of the radio resources to allocate to the second communication interface, according to a power headroom indicated by the radio resource information. In some embodiments, the at least one processor is configured to increase a portion of the radio resources to allocate to the first communication interface to satisfy a QoS of the first communication interface.

In some embodiments, the sensor is configured to detect whether the device is in contact with the user. In some embodiments, the at least one processor is configured to predict the amount of radiation exposure for the time period to be a first amount, if the device is in contact with the user. In some embodiments, the at least one processor is configured to predict the amount of radiation exposure for the time period to be a second amount that is less than the first amount, if the device is not in contact with the user.

In some embodiments, the at least one processor is configured to allocate the radio resources to the at least one communication interface by determining a first transmission power level for the at least one communication interface to support the QoS during a first time period within the time period. In some embodiments, the at least one processor is configured to allocate the radio resources to the at least one communication interface by determining a second transmission power level for the at least one communication interface less than the first transmission power level during a second time period within the time period, the amount of radiation exposure corresponding to a time average of i) the first transmission power level and ii) the second transmission power level less than the time averaged threshold amount of radiation exposure.

In some embodiments, the at least one processor is configured to determine, according to the QoS and the radio resource information, a device state of each of a first communication interface and a second communication interface of the at least one communication interface. In some embodiments, the at least one processor is configured to allocate the radio resources to the first communication interface and the second communication interface, according to the determined device states.

Various embodiments disclosed herein are related to a method of controlling a communication link. In some embodiments, the method includes detecting, by a sensor, a proximity of a user. In some embodiments, the method includes determining, by at least one processor, a quality of service (QoS) indicating a target performance of a communication link of at least one communication interface. In some embodiments, the method includes determining, by the at least one processor, radio resource information of the at least one communication interface. In some embodiments, the method includes predicting, by the at least one processor, an amount of radiation exposure for a time period according to the QoS, the radio resource information, and the detected proximity of the user. In some embodiments, the method includes comparing, by the at least one processor, the predicted amount of radiation exposure for the time period against a time averaged threshold amount of radiation exposure. In some embodiments, the method includes allocating, by the at least one processor, radio resources to the at least one communication interface, according to the comparison.

In some embodiments, the method includes allocating, by the at least one processor, a first amount of radio resources to the at least one communication interface, if the predicted amount of radiation exposure is above the time averaged threshold amount of radiation exposure. In some embodiments, the method includes allocating, by the at least one processor, a second amount of radio resources higher than the first amount of radio resources, to the at least one communication interface, if the predicted amount of radiation exposure is less than the time averaged threshold amount of radiation exposure.

In some embodiments, the at least one communication interface includes a first communication interface and a second communication interface. In some embodiments, the method further includes increasing, by the at least one processor, a portion of the radio resources to allocate to the first communication interface to satisfy a first QoS of the first communication interface that is higher than a second QoS of the second communication interface. In some embodiments, the method further includes decreasing, by the at least one processor, a portion of the radio resources to allocate to the second communication interface. In some embodiments, the radio resource information includes at least one of: a power headroom, a power level of power source or a frequency band of the at least one communication interface.

In some embodiments, the at least one communication interface includes a first communication interface and a second communication interface. In some embodiments, the method further includes decreasing, by the at least one processor, a portion of the radio resources to allocate to the second communication interface, according to a power headroom indicated by the radio resource information. In some embodiments, the method includes increasing, by the at least one processor, a portion of the radio resources to allocate to the first communication interface to satisfy a QoS of the first communication interface.

In some embodiments, the method includes detecting the proximity of the user comprises detecting whether a device including the sensor is in contact with the user. In some embodiments, the method includes predicting, by the at least one processor, the amount of radiation exposure for the time period to be a first amount, if the device is in contact with the user. In some embodiments, the method includes predicting, by the at least one processor, the amount of radiation exposure for the time period to be a second amount that is less than the first amount, if the device is not in contact with the user.

In some embodiments, allocating the radio resources to the at least one communication interface comprises determining, by the at least one processor, a first transmission power level for the at least one communication interface to support the QoS during a first time period within the time period. In some embodiments, allocating the radio resources to the at least one communication interface comprises determining, by the at least one processor, a second transmission power level for the at least one communication interface less than the first transmission power level during a second time period within the time period, the amount of radiation exposure corresponding to a time average of i) the first transmission power level and ii) the second transmission power level less than the time averaged threshold amount of radiation exposure.

In some embodiments, the method includes determining, by the at least one processor according to the QoS and the radio resource information, a device state of each of a first communication interface and a second communication interface of the at least one communication interface. In some embodiments, the method includes allocating, by the at least one processor, the radio resources to the first communication interface and the second communication interfaces, according to the determined device states.

Various embodiments disclosed herein are related to a non-transitory computer readable medium storing instructions for controlling a communication link. In some embodiments, the non-transitory computer readable medium stores instructions when executed by one or more processors cause the one or more processors to cause a sensor to detect a proximity of a user. In some embodiments, the instructions when executed by the one or more processors cause the one or more processors to determine a quality of service (QoS) indicating a target performance of a communication link of at least one communication interface. In some embodiments, the instructions when executed by the one or more processors cause the one or more processors to determine radio resource information of the at least one communication interface. In some embodiments, the instructions when executed by the one or more processors cause the one or more processors to predict an amount of radiation exposure for a time period according to the QoS, the radio resource information, and the detected proximity of the user. In some embodiments, the instructions when executed by the one or more processors cause the one or more processors to compare the predicted amount of radiation exposure for the time period against a time averaged threshold amount of radiation exposure. In some embodiments, the instructions when executed by the one or more processors cause the one or more processors to allocate radio resources to the at least one communication interface, according to the comparison.

In some embodiments, the instructions when executed by the one or more processors cause the one or more processors to increase a portion of the radio resources to allocate to a first communication interface of the at least one communication interface, to satisfy a first QoS of the first communication interface that is higher than a second QoS of a second communication interface of the at least one communication interface. In some embodiments, the instructions when executed by the one or more processors cause the one or more processors to decrease a portion of the radio resources to allocate to the second communication interface.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to a wearable device adjusting or controlling a wireless communication link based on time averaged specific absorption rate (SAR) and quality of service (QoS). QoS may indicate a target performance of a wireless communication link. For example, QoS may specify throughput, transit delay, priority, protection, etc. QoS may be determined based on a type of content (e.g., voice over IP, artificial reality (e.g., augmented reality, virtual reality, mixed reality)) to be transmitted or a process to be performed (e.g., hand over, cell search, etc.). QoS may be also determined based on a frequency band or a protocol for transmission, or based on other network condition (e.g., traffic or congestion). The wearable device may detect a proximity of a user, and predict a time averaged SAR for a time period according to the QoS and the detected proximity of the user. The wearable device may compare the predicted amount of radiation exposure for the time period against a time averaged threshold amount of radiation exposure, and allocate radio resources according to the comparison.

Advantageously, disclosed systems and methods can adaptively control, adjust or change a communication link. In one aspect, a transmission power level can be determined or adjusted, according to the QoS, radio resource information (e.g. power headroom) and/or the time averaged SAR. For example, a high power transmission for a brief moment within a time period may be allowed to support the QoS, while ensuring that the predicted time averaged SAR during the time period is below a time averaged threshold amount of radiation exposure. Hence, a communication link can be established or maintained in a reliable manner for a particular content or a process.

Figure 1:
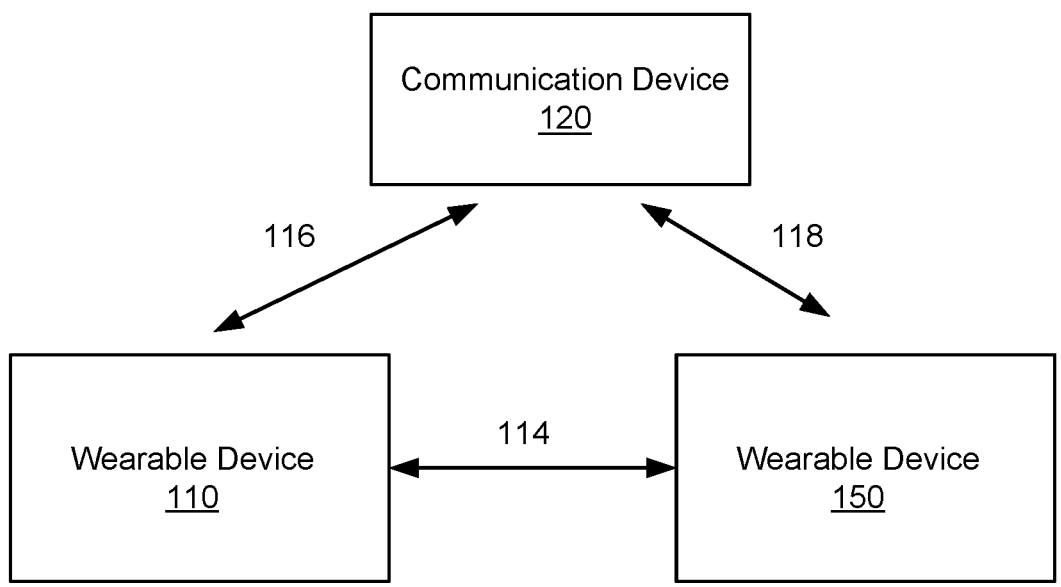
FIG. 1 is a diagram of a system environment including wearable devices, according to an example implementation of the present disclosure.

FIG. 1 is a block diagram of an example system 100. In some embodiments, the system 100 includes a communication device 120, a wearable device 110, and a wearable device 150. The wearable device 110 may be a smart watch, and the wearable device 150 may be a head wearable device (HWD) 150. The communication device 120 may be an access point or any other communication device. The HWD 150 may be referred to as, include, or be part of a head mounted display (HMD), head mounted device (HMD), head worn display (HWD) or head worn device (HWD). The wearable device 110 and the HWD 150 may communicate with each other through a communication link 114. The wearable device 110 and the communication device 120 may communicate with each other through a communication link 116, and the wearable device 150 and the communication device 120 may communicate with each other through a communication link 118. Through the wireless links 116, 118, the wearable devices 110, 150 may access content (e.g., text, image, audio, video, etc.) from other devices. The communication links 114, 116, 118 may be wireless links (e.g., cellular link, Wi-Fi link, Bluetooth link, 60 GHz link, ultra wideband link, etc.). The communication links 114, 116, 118 may each have an associated QoS and/or radio resource information. The communication links 114, 116, 118 may be based on the same protocol or different protocols. For example, the communication links 116, 118 may conform to the 3G, 4G, 5G, LTE, 60 GHz protocol, where the communication link 114 may conform to the Wi-Fi link, Bluetooth, etc. In some embodiments, the system 100 includes more, fewer, or different components than shown in FIG. 1.

In one aspect, the wearable device 110 and the wearable device 150 may operate together to provide/support artificial reality for a user. In one example, the wearable device 150 may detect a location and an orientation of the wearable device 150, and generate a sensor measurement indicating the detected location and orientation of the wearable device 150. The wearable device 150 may transmit the sensor measurement to the wearable device 110 through the communication link 114. The wearable device 110 may receive the sensor measurement, and may generate or determine a view of the artificial reality corresponding to the detected location and orientation of the wearable device 150. The wearable device 110 may generate image data of the determined view of the artificial reality, and transmit the image data to the wearable device 150 through the communication link 114. The HWD 150 may receive the image data, and can present an image of the artificial reality to a user according to the image data. In one aspect, the process of detecting the location and the orientation of the HWD 150, and rendering the image to the user should be performed within a frame time (e.g., 11 ms or 16 ms). Any latency between a movement of the user wearing the HWD and an image displayed corresponding to the user movement can cause judder, which may result in motion sickness and can degrade the user experience.

In one aspect, the wearable devices 110, 115 may dynamically adjust or control the communication link 114, the communication link 116, the communication link 118 or any combination of them based on time averaged specific absorption rate (SAR) and/or quality of service (QoS). QoS may indicate a target performance of a wireless communication link. The wearable devices 110, 150 may detect a proximity of a user to the wearable devices 110, 150, and can predict a time averaged SAR for a time period according to the QoS and the detected proximity of the user. For example, the wearable devices 110, 115 may detect whether the wearable device 110, the wearable device 115 or both are worn or held by the user. The wearable devices 110, 115 may compare the predicted amount of radiation exposure for the time period against a time averaged threshold amount of radiation exposure, and can allocate radio resources according to the comparison.

In one aspect, a transmission power level can be determined or adjusted, according to the QoS and/or the time averaged SAR. For example, a high power transmission for a brief moment within a time period may be allowed to support the QoS, while ensuring that the predicted time averaged SAR during the time period is below a time averaged threshold amount of radiation exposure. Hence, the communication link 114, the communication link 116, and/or the communication link 118 can be established or maintained in a reliable manner for a particular content or a process.

Figure 2:
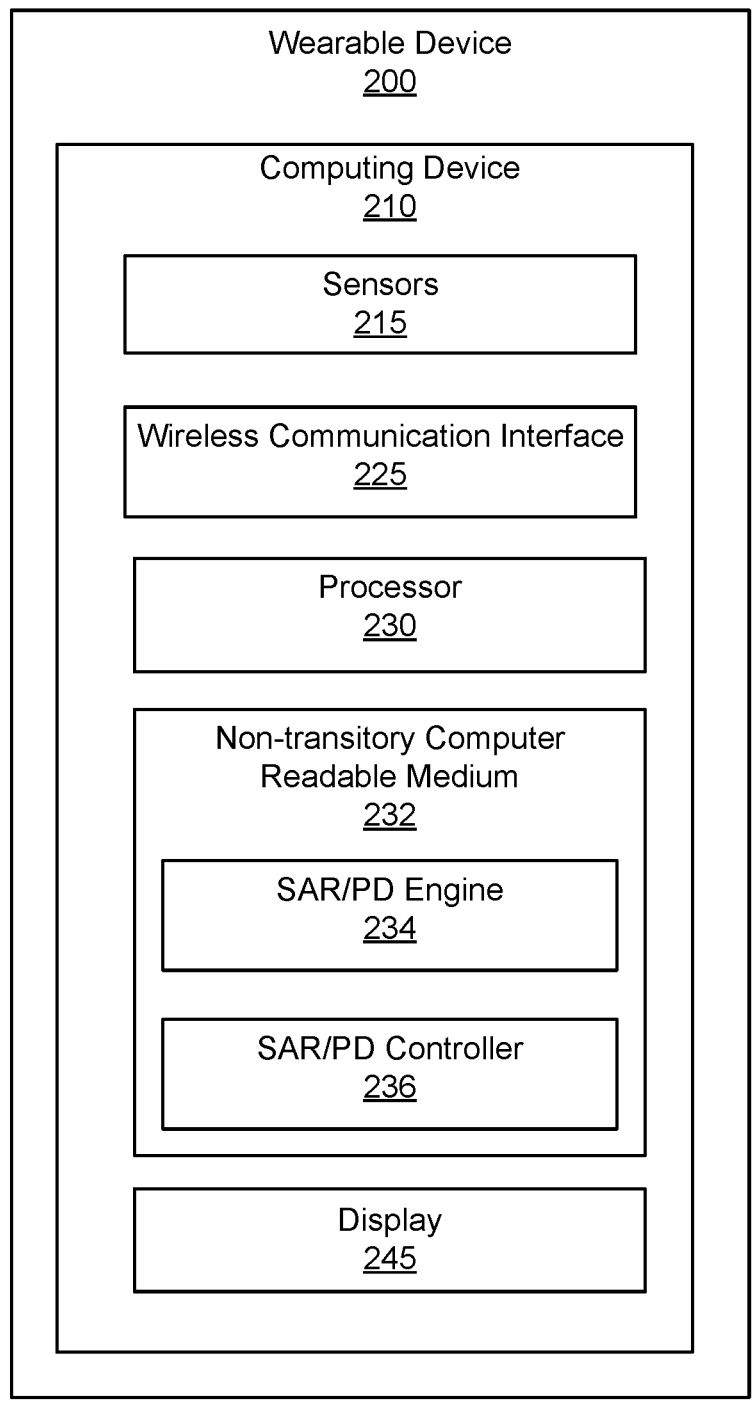
FIG. 2 is a diagram of a wearable device, according to an example implementation of the present disclosure.

FIG. 2 is a diagram of a wearable device 200, according to an example implementation of the present disclosure. In some embodiments, the wearable device 200 may be the wearable device 110 or the wearable device 150. In some embodiments, the wearable device 200 includes sensors 215, wireless communication interface 225, processor 230, non-transitory computer readable medium 232, and a display 245. These components may operate together to communicate with another device, and generate or render content (e.g., AR content). In other embodiments, the wearable device 20 includes more, fewer, or different components than shown in FIG. 2.

In some embodiments, the sensors 215 include electronic components or a combination of electronic components and software components that detect a proximity of a user wearing the wearable device 200. For example, the sensors 215 can include a hall sensor that can detect whether the user is proximate (e.g., less than 10 mm) to the sensor or whether the user is contacting the wearable device 200. The sensors 215 may detect a proximity of the user with respect to the wearable device 200, and generate a sensor measurement data indicating the detected proximity.

In some embodiments, the sensors 215 include electronic components or a combination of electronic components and software components that can operate to sense/determine/measure a location and an orientation of the wearable device 200. Examples of the sensors 255 can include: one or more imaging sensors, one or more accelerometers, one or more gyroscopes, one or more magnetometers, or any other suitable type of sensor(s) that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 215 detect the translational movement and the rotational movement, and determine an orientation and location of the wearable device 200. The sensors 215 may generate sensor measurements indicating the detected location and orientation of the wearable device 200.

In some embodiments, the wireless communication interface 225 includes an electronic component or a combination of an electronic component and a software component that communicates with another device through a wireless communication link (e.g., communication link 114, 116, 118). In some embodiments, the wireless communication interface 225 includes or is embodied as a transceiver or a communication modem coupled to the transceiver for transmitting and receiving data through a wireless medium. The wireless communication interface 225 may transmit or receive sensor measurement data indicating a location and an orientation of the wearable device 200. Moreover, the wireless communication interface 225 may transmit or receive image data indicating or corresponding to an image to be rendered.

In some embodiments, the processor 230 includes an electronic component or a combination of an electronic component that can execute instructions stored by the non-transitory computer readable medium 232. The processor 230 may include one or more central processing units (CPUs), graphical processing units (GPUs) or a combination of them. The non-transitory computer readable medium 232 may store instructions for executing one or more applications executable by the processor 230.

One example application when executed by the processor 230 may cause the processor 230 to generate or process content for rendering. The processor 230 executing the application may cause the processor 230 to generate image data for rendering, according to sensor measurement data from the sensors 215 or the wireless communication interface 225. For example, the processor 230 executing the application may determine a view of the AR corresponding to detected location and orientation in the sensor measurement data and generate image data of the determined view of the AR.

Example applications when executed by the processor 230 may cause the processor 230 to control or adjust the wireless communication interface 225. Example applications include specific absorption rate (SAR)/power density (PD) engine and SAR/PD controller 236. These applications may be executed by the processor 230 to adaptively or dynamically control/manage the wireless communication interface(s) 225, according to time averaged SAR and QoS. In one approach, the SAR/PD engine 234 may determine time averaged SAR, QoS, and radio resources of the wireless communication interface 225, and can determine, from a plurality of states (e.g., device states), a state of operation of the wireless communication interface 225, according to the determined time averaged SAR, QoS, and radio resources. The SAR/PD controller 236 may allocate radio resources according to the determined state, and configure or operate the wireless communication interface(s) 225 according to the allocated radio resources.

In one approach, the processor 230 executing the SAR/PD engine 234 determines QoS for the wireless communication interface(s) 225. QoS may indicate a target performance of a wireless communication link established or maintained by the wireless communication interface 225. For example, QoS of a communication link may specify throughput, transit delay, priority, protection, etc., of the communication link. The processor 230 executing the SAR/PD engine 234 may determine QoS based on a type of content (e.g., voice over IP, artificial reality (e.g., augmented reality, virtual reality, mixed reality)) to be transmitted. The processor 230 executing the SAR/PD engine 234 may determine QoS based on a process to be performed (e.g., hand over, cell search, etc.). The processor 230 executing the SAR/PD engine 234 may determine QoS based on a frequency band or a protocol for transmission, or other network condition (e.g., traffic or congestion).

In one approach, the processor 230 executing the SAR/PD engine 234 determines or predicts an amount of radiation exposure of the user for a time period. The processor 230 executing the SAR/PD engine 234 may determine or predict the amount of radiation exposure, according to the detected proximity of the user. The predicted amount of radiation exposure may be inversely proportional to the detected proximity of the user. For example, in response to determining that the wearable device 200 is in contact with the user, the processor 230 executing the SAR/PD engine 234 may select a state to reduce an average output power level of the wireless communication interface 225. For example, in response to determining that the wearable device 200 is not in contact with the user, the processor 230 executing the SAR/PD engine 234 may select a state to increase an average output power level of the wireless communication interface 225.

In one approach, the processor 230 executing the SAR/PD engine 234 determines or predicts an amount of radiation exposure of the user for a time period, according to QoS and/or radio resource information. Radio resource information may indicate power headroom (e.g., for different frequency bands of the wireless communication link), remaining/available/used power level of a power source of the wearable device 200, etc. For example, the processor 230 executing the SAR/PD engine 234 may determine, from available radio resources, one or more frequency bands and output power levels to support the QoS, and may determine a time averaged SAR according to transmission at the determined output power levels for the determined one or more frequency bands. The processor 230 may store or accumulate a history of output power levels of different frequency bands and/or different wireless communication interface 225 to determine time averaged SAR.

In one approach, the processor 230 executing the SAR/PD engine 234 determines a state of operation of the wireless communication interface 225 according to a predicted amount of time averaged SAR for a time period. For example, the processor 230 executing the SAR/PD engine 234 allows the wireless communication interface 225 to transmit at a high power level (e.g., over 5 dBm) for a brief moment (e.g., 100 ms) within a time period (e.g., 60 seconds) to support the QoS, while ensuring that the predicted time averaged SAR during the time period (e.g., 60 seconds) is below a time averaged threshold amount of radiation exposure. For example, the processor 230 executing the SAR/PD engine 234 may increase a portion of radio resources of a first wireless communication interface 225 (e.g., cellular network such as 3G, 4G, 5G, etc.) to support QoS of the first wireless communication interface 225, while decreasing a portion of radio resources of a second wireless communication interface 225 (e.g., Bluetooth). The processor 230 executing the SAR/PD engine 234 may apply different time periods for different frequency bands or different wireless communication interface 225 to determine the time averaged SAR. For example, time averaged SAR may be determined for 100 seconds for a frequency band below 3 GHz, 60 seconds for a frequency band between 3 GHz and 6 GHz, and 4 seconds for a frequency band between 24 and 42 GHz. The processor 230 executing the SAR/PD engine 234 may allocate radio resources (e.g., to a plurality of wireless communication interfaces) in a manner that time averaged SAR can be below the time averaged threshold and QoS (of one of more of the associated wireless communication links) can be supported/met/satisfied for a time period. The processor 230 executing the SAR/PD engine 234 may select a state of operation (e.g., device state) of each of the wireless communication interfaces 225, according to the allocated radio resources.

In one approach, the processor 230 executing the SAR/PD controller 236 can receive the determined state from the SAR/PD engine 234, and applies one or more policies corresponding to the determined state. For example, a policy may indicate or specify a radio control, output power level over time, resource sharing, etc., for a wireless communication interface 225. The processor 230 executing the SAR/PD controller 236 may determine or identify one or more policies corresponding to the determined state. Moreover, the processor 230 executing the SAR/PD controller 236 may cause or provide an instruction to configure or operate the wireless communication interface 225, according to the one or more policies. Accordingly, prioritized content (e.g., AR content, or voice over IP) can be provided or prioritized process (e.g., hand over, cell search, etc.) can be performed by allocating more radio resources (e.g., relative to non-prioritized content), based on time averaged SAR.

In some embodiments, the display 245 is an electronic component that displays an image. The display 245 may, for example, be a liquid crystal display or an organic light emitting diode display. The display 245 may be a transparent display that allows the user to see through.

Figure 3:
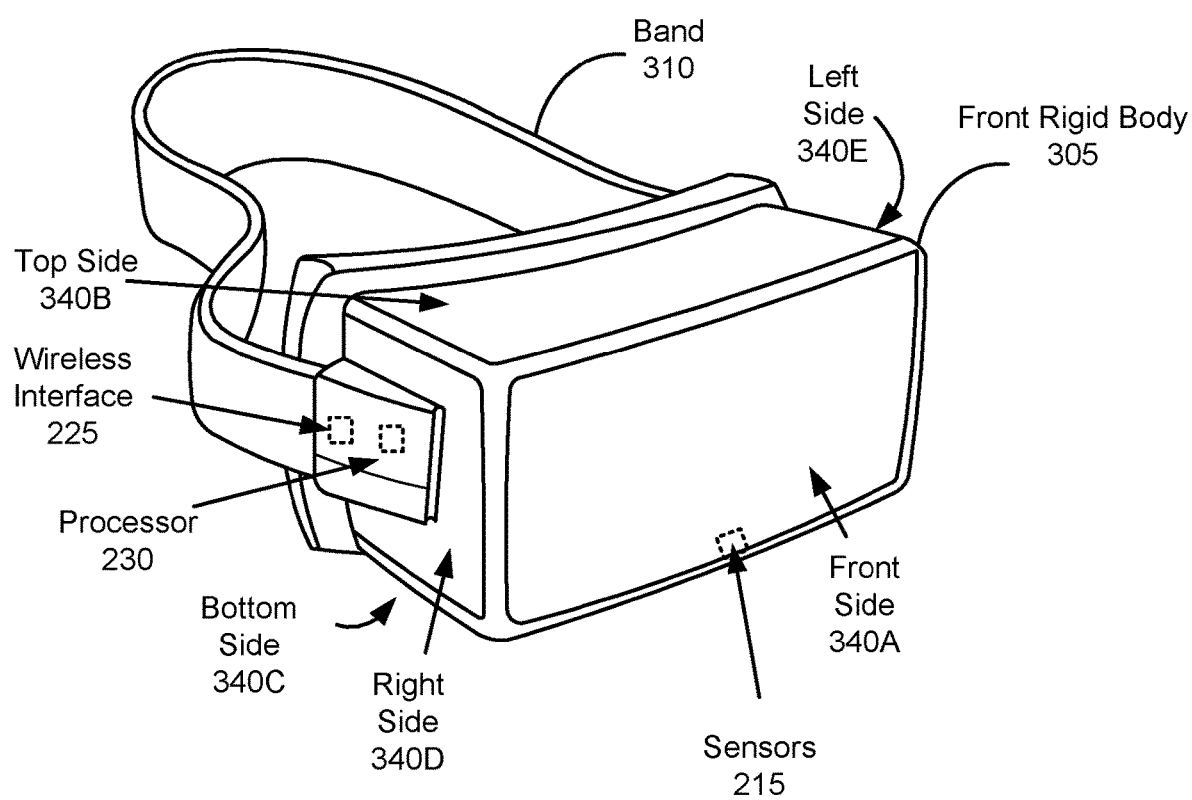
FIG. 3 is a diagram showing a perspective view of a head wearable display, according to an example implementation of the present disclosure.

FIG. 3 is a diagram of the HWD 150, in accordance with an example embodiment. In some embodiments, the HWD 150 includes a front rigid body 305 and a band 310. The front rigid body 305 includes the display 245 (not shown in FIG. 3), lens (not shown in FIG. 3), the sensors 215, the wireless communication interface 225, and the processor 230. In the embodiment shown by FIG. 3, the wireless communication interface 225, the processor 230, and the sensors 215 are located within the front rigid body 205, and may not be visible to the user. In other embodiments, the HWD 150 has a different configuration than shown in FIG. 3. For example, the wireless communication interface 225, the processor 230, and/or the sensors 215 may be in different locations than shown in FIG. 3.

Figure 4A:
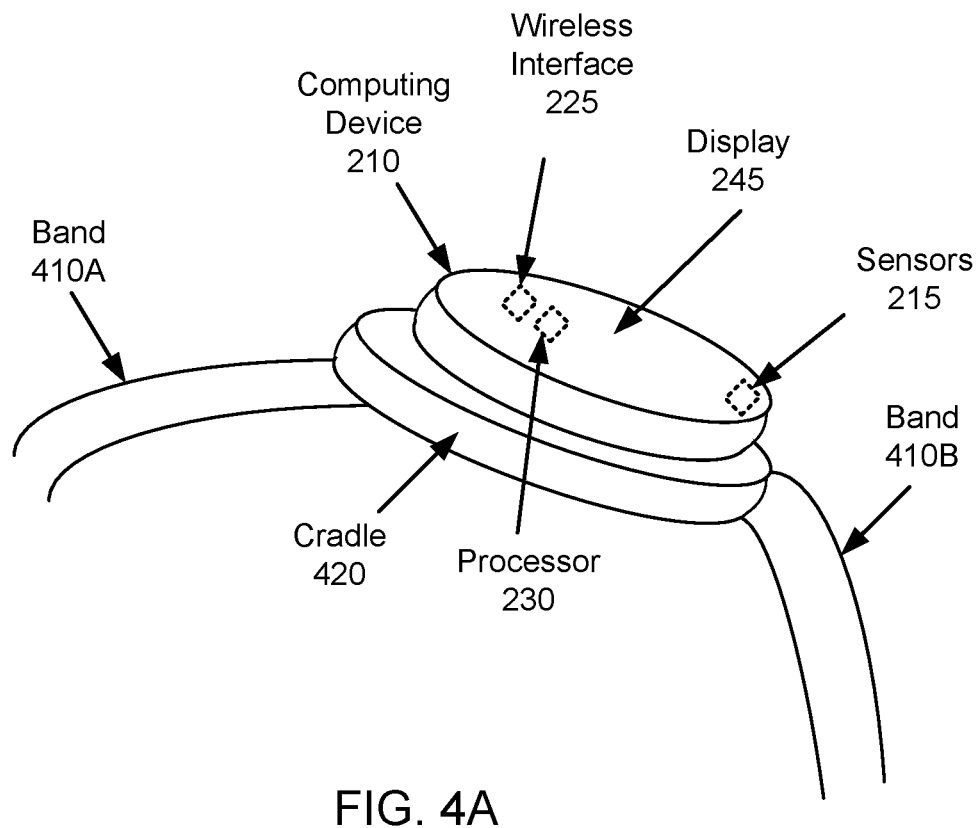
FIG. 4A is a diagram showing a perspective view of a wearable device including a computing device attached to a cradle, according to an example implementation of the present disclosure.
Figure 4B:
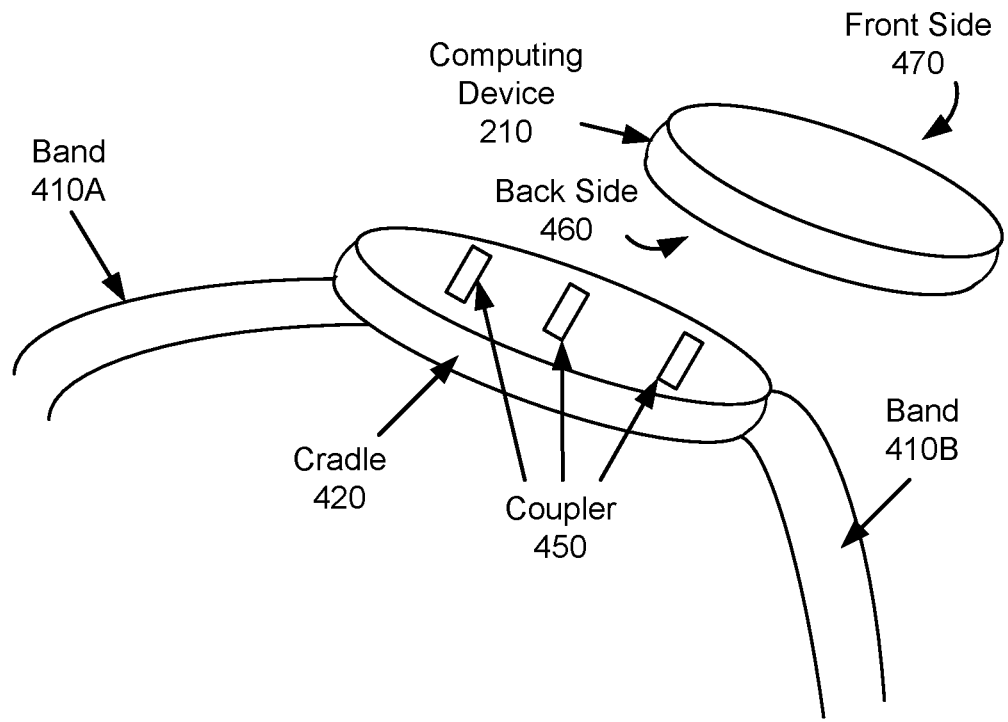
FIG. 4B is a diagram showing a perspective view of a wearable device including a computing device detached from a cradle, according to an example implementation of the present disclosure.

FIG. 4A is a diagram showing a perspective view of the wearable device 110A including a computing device 210 attached to a cradle 420, according to an example implementation of the present disclosure. The processor 230, the wireless communication interface 225 and the sensors 215 may be within a housing of the computing device 210, such that the processor 230, the wireless communication interface 225 and the sensors 215 may not be visible to the user. The computing device 210 may also include the display 245 on a front side 470 to present text or image. The computing device 210 may be detachable from the cradle 420 as shown in FIG. 4B. The computing device 210 may be detached from the cradle 420 to allow the user to charge the battery of the computing device 210, connect to another device through a cable, or capture an image, etc. The cradle 420 may be a wearable structure or a component to selectively hold or couple the computing device 210. The cradle 420 may include one or more couplers 450, to which a back side 460 of the computing device 210 can be attached. One or more couplers 450 may be mechanical latches, magnetics, hook and loop fasteners, or any components that allow the cradle 420 to selectively hold or couple the computing device 210. The cradle 420 may include or may be attached to wrist bands 410A, 420B.

Figure 5:
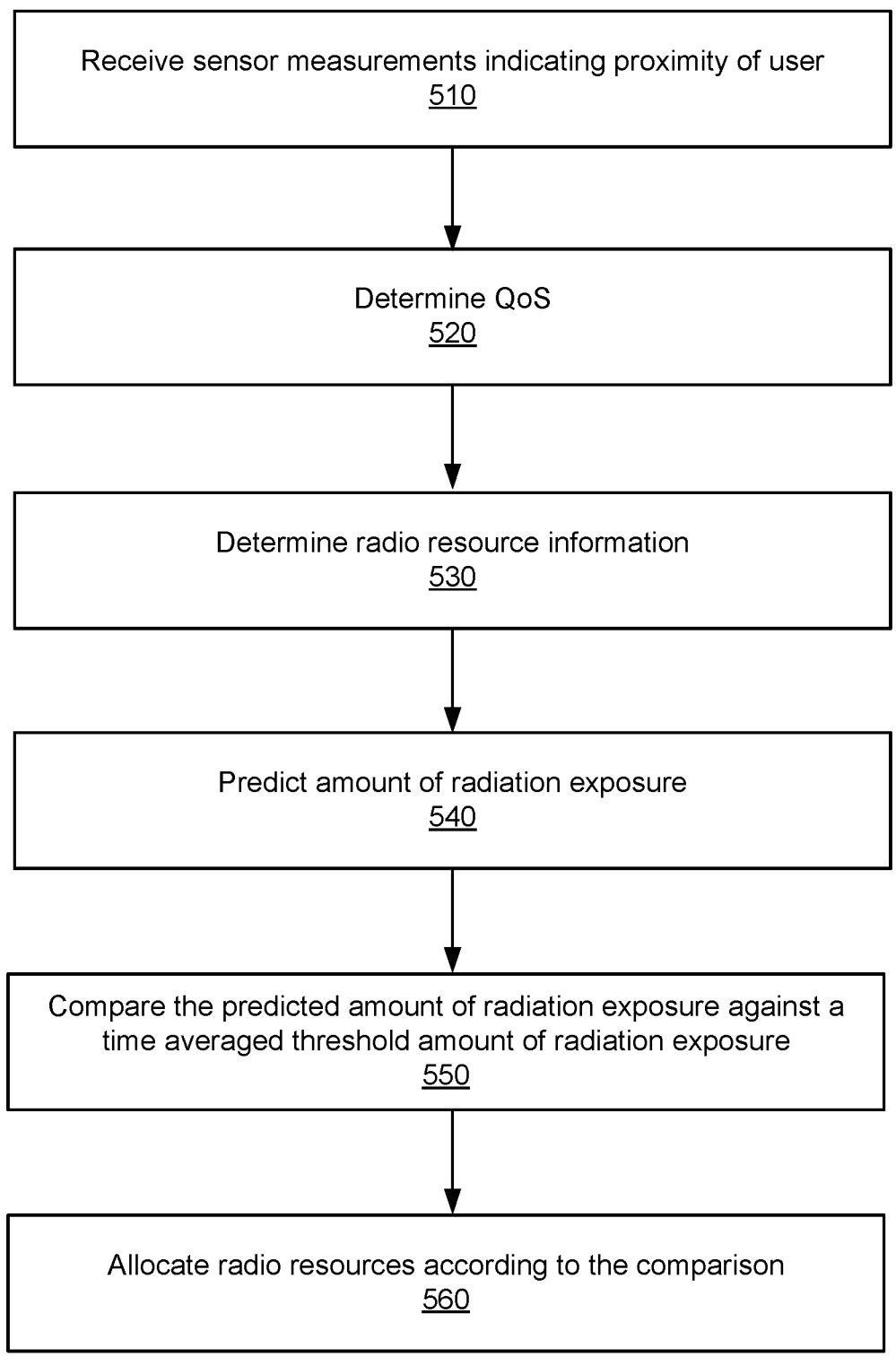
FIG. 5 is a flowchart showing a process of a device establishing a communication link according to a time averaged specific absorption rate and quality of service, according to an example implementation of the present disclosure.

FIG. 5 is a flowchart showing a process 500 of a device establishing a communication link according to a time averaged SAR and QoS, according to an example implementation of the present disclosure. In some embodiments, the process 500 is performed by the wearable device 110 or the wearable device 150. In some embodiments, the process 500 is performed by other entities. In some embodiments, the process 500 includes more, fewer, or different steps than shown in FIG. 5.

In one approach, the wearable device receives 510 sensor measurements indicating proximity of a user relative to the wearable device or its antennas. The wearable device may include sensors 215 that can detect a proximity of the user with respect to the wearable device. For example, the sensors 215 may detect whether the user is wearing/holding the wearable device or not. For example, the sensors 215 may detect whether the computing device 210 is attached to the cradle 420 or not. The sensors 215 may generate the sensor measurements indicating the detected proximity (e.g., distance or amount of contact) of the user.

In one approach, the wearable device determines 520 a QoS indicating a target performance of a wireless communication link. For example, QoS may specify throughput, transit delay, priority, protection, etc. QoS may be determined based on a type of content (e.g., voice over IP, artificial reality (e.g., augmented reality, virtual reality, mixed reality)) to be transmitted or a process to be performed (e.g., hand over, cell search, etc.). QoS may be also determined based on a frequency band or a protocol for transmission, or other network condition (e.g., traffic or congestion).

In one approach, the wearable device determines 530 radio resource information. Radio resource information may indicate power headroom for different frequency bands of the wireless link, remaining power level of a power source of the wearable device, etc. For example, the wireless device may determine, from available radio resources, one or more frequency bands and output power levels to support the QoS, and can determine a time averaged SAR according to transmission at the determined output power levels for the determined one or more frequency bands. In one example, output power levels and/or frequency bands may be time varying, and the wearable device may store or accumulate a history of output power levels of different frequency bands and/or different wireless communication interfaces 225.

In one approach, the wearable device predicts 540 an amount of radiation exposure of the user. The wearable device may predict/project/estimate the amount of radiation exposure, according to the detected proximity of the user, QoS, and/or radio resource information. For example, the wearable device determines or predicts the amount of radiation exposure, according to the detected proximity of the user. The predicted amount of radiation exposure may be inversely proportional to the detected proximity of the user. The wearable device may determine one or more frequency bands and output power levels to support the QoS (e.g., of each communication link), and can predict an amount of radiation exposure due to transmission at the determined frequency bands and output power levels for a time period.

In one approach, the wearable device compares 550 the predicted amount of radiation exposure against a time averaged threshold amount of radiation exposure. In one approach, the wearable device allocates 560 radio resources according to the comparison. For example, if the wireless device determines that time averaged SAR for a first time period (e.g., 59 seconds) within a time period (e.g., 60 seconds) is less than the time averaged threshold amount of radiation exposure, the wireless device may allow transmission at a high power level (e.g., over 5 dBm) for a second time period (e.g., 1 s) within the time period (e.g., 60 seconds) in a manner that the time averaged SAR for the time period (e.g., 60 seconds) is less than the time averaged threshold amount of radiation exposure, so as to support a desired QoS. For example, if the wireless device determines that time averaged SAR for the time period (e.g., 60 seconds) may exceed the time averaged threshold amount of radiation exposure, the wireless device may increase a portion of radio resources of a first wireless communication interface 225 (e.g., cellular network such as 3G, 4G, 5G, etc.) to support QoS of the first wireless communication interface 225, while decreasing a portion of radio resources of a second wireless communication interface 225 (e.g., Bluetooth). Accordingly, the time averaged SAR for the time period (e.g., 60 seconds) according to allocation of radio resources can be less than the time averaged threshold amount of radiation exposure.

Figure 6:
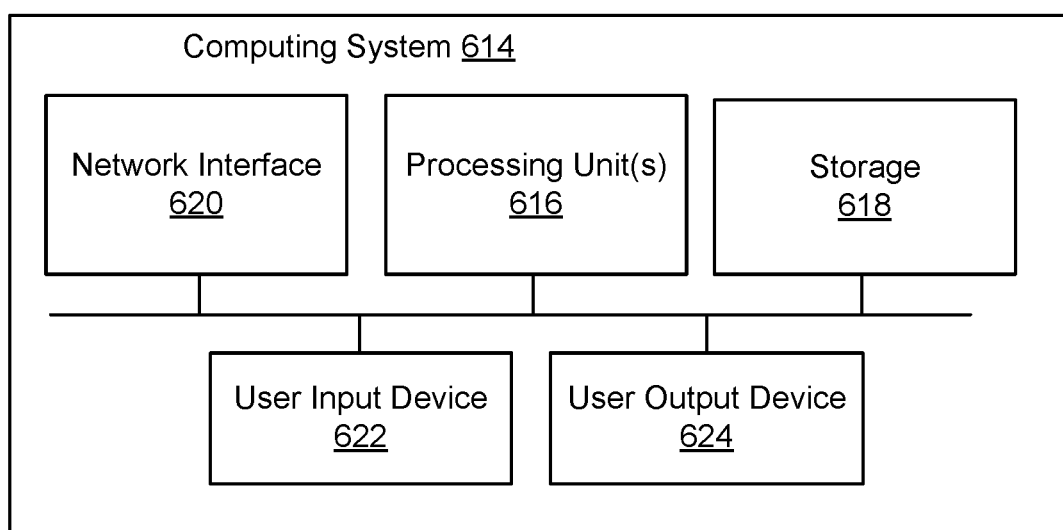
FIG. 6 is a block diagram of a computing environment according to an example implementation of the present disclosure.

Various operations described herein can be implemented on computer systems. FIG. 6 shows a block diagram of a representative computing system 614 usable to implement the present disclosure. In some embodiments, the wearable device 110, the wearable device 150 or both of FIG. 1 are implemented by the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A device comprising:
   at least one communication interface;
   a sensor configured to detect a proximity of a user; and
   at least one processor coupled to the sensor, the at least one processor configured to:
      determine a quality of service (QoS) indicating a target performance of a communication link of the at least one communication interface,
      determine radio resource information of the at least one communication interface,
      predict an amount of radiation exposure for a time period according to the QoS, the radio resource information, and the detected proximity of the user,
      compare the predicted amount of radiation exposure for the time period against a time averaged threshold amount of radiation exposure, and
      allocate radio resources to the at least one communication interface, according to the comparison by determining a first transmission power level to meet the target performance during a first time period of the time period and a second transmission power level during a second time period of the time period, the second transmission power level less than the time averaged threshold amount of radiation exposure.

2. The device of claim 1, wherein the at least one processor is configured to:
   allocate a first amount of radio resources to the at least one communication interface, if the predicted amount of radiation exposure is above the time averaged threshold amount of radiation exposure, and
   allocate a second amount of radio resources higher than the first amount of radio resources, to the at least one communication interface, if the predicted amount of radiation exposure is less than the time averaged threshold amount of radiation exposure.

3. The device of claim 1, wherein the at least one communication interface includes a first communication interface and a second communication interface, and the at least one processor is configured to:
   increase a portion of the radio resources to allocate to the first communication interface to satisfy a first QoS of the first communication interface that is higher than a second QoS of the second communication interface, and
   decrease a portion of the radio resources to allocate to the second communication interface.

4. The device of claim 1, wherein the radio resource information includes at least one of: a power headroom, a power level of power source or a frequency band of the at least one communication interface.

5. The device of claim 1, wherein the at least one communication interface includes a first communication interface and a second communication interface, and the at least one processor is configured to:
   decrease a portion of the radio resources to allocate to the second communication interface, according to a power headroom indicated by the radio resource information, and
   increase a portion of the radio resources to allocate to the first communication interface to satisfy a QoS of the first communication interface.

6. The device of claim 1, wherein the sensor is configured to detect whether the device is in contact with the user.

7. The device of claim 6, wherein the at least one processor is configured to:
predict the amount of radiation exposure for the time period to be a first amount, if the device is in contact with the user, and
predict the amount of radiation exposure for the time period to be a second amount that is less than the first amount, if the device is not in contact with the user.

8. The device of claim 1, wherein the at least one processor is configured to allocate the radio resources to the at least one communication interface by:
determining the first transmission power level for the at least one communication interface to support the QoS during the first time period within the time period, and
determining the second transmission power level for the at least one communication interface less than the first transmission power level during the second time period within the time period, the amount of radiation exposure corresponding to a time average of i) the first transmission power level and ii) the second transmission power level.

9. The device of claim 1, wherein the at least one processor is configured to:
determine, according to the QoS and the radio resource information, a device state of each of a first communication interface and a second communication interface of the at least one communication interface, and
allocate the radio resources to the first communication interface and the second communication interface, according to the determined device states.

10. A method comprising:
detecting, by a sensor, a proximity of a user;
determining, by at least one processor, a quality of service (QoS) indicating a target performance of a communication link of at least one communication interface;
determining, by the at least one processor, radio resource information of the at least one communication interface;
predicting, by the at least one processor, an amount of radiation exposure for a time period according to the QoS, the radio resource information, and the detected proximity of the user;
comparing, by the at least one processor, the predicted amount of radiation exposure for the time period against a time averaged threshold amount of radiation exposure; and
allocating, by the at least one processor, radio resources to the at least one communication interface, according to the comparison, the radio resources having a first transmission power level to meet the target performance during a first time period of the time period and a second transmission power level during a second time period of the time period, the second transmission power level less than the time averaged threshold amount of radiation exposure.

11. The method of claim 10, further comprising:
allocating, by the at least one processor, a first amount of radio resources to the at least one communication interface, if the predicted amount of radiation exposure is above the time averaged threshold amount of radiation exposure; and
allocating, by the at least one processor, a second amount of radio resources higher than the first amount of radio resources, to the at least one communication interface, if the predicted amount of radiation exposure is less than the time averaged threshold amount of radiation exposure.

12. The method of claim 10, wherein the at least one communication interface includes a first communication interface and a second communication interface, the method further comprising:
increasing, by the at least one processor, a portion of the radio resources to allocate to the first communication interface to satisfy a first QoS of the first communication interface that is higher than a second QoS of the second communication interface; and
decreasing, by the at least one processor, a portion of the radio resources to allocate to the second communication interface.

13. The method of claim 10, wherein the radio resource information includes at least one of: a power headroom, a power level of power source or a frequency band of the at least one communication interface.

14. The method of claim 10, wherein the at least one communication interface includes a first communication interface and a second communication interface, the method further comprising:
decreasing, by the at least one processor, a portion of the radio resources to allocate to the second communication interface, according to a power headroom indicated by the radio resource information; and
increasing, by the at least one processor, a portion of the radio resources to allocate to the first communication interface to satisfy a QoS of the first communication interface.

15. The method of claim 10, wherein detecting the proximity of the user comprises detecting whether a device including the sensor is in contact with the user.

16. The method of claim 15, further comprising:
predicting, by the at least one processor, the amount of radiation exposure for the time period to be a first amount, if the device is in contact with the user; and
predicting, by the at least one processor, the amount of radiation exposure for the time period to be a second amount that is less than the first amount, if the device is not in contact with the user.

17. The method of claim 10, wherein allocating the radio resources to the at least one communication interface comprises:
determining, by the at least one processor, the first transmission power level for the at least one communication interface to support the QoS during the first time period within the time period, and
determining, by the at least one processor, the second transmission power level for the at least one communication interface less than the first transmission power level during the second time period within the time period, the amount of radiation exposure corresponding to a time average of i) the first transmission power level and ii) the second transmission power level.

18. The method of claim 10, further comprising:
determining, by the at least one processor according to the QoS and the radio resource information, a device state of each of a first communication interface and a second communication interface of the at least one communication interface; and
allocating, by the at least one processor, the radio resources to the first communication interface and the second communication interfaces, according to the determined device states.

19. A non-transitory computer readable medium storing instructions for causing one or more processors to:
   cause a sensor to detect a proximity of a user; and
   determine a quality of service (QoS) indicating a target performance of a communication link of at least one communication interface;
   determine radio resource information of the at least one communication interface;
   predict an amount of radiation exposure for a time period according to the QoS, the radio resource information, and the detected proximity of the user;
   compare the predicted amount of radiation exposure for the time period against a time averaged threshold amount of radiation exposure; and
   allocate radio resources to the at least one communication interface, according to the comparison, the radio resources corresponding to a first transmission power level during a first portion of the time period and a second transmission power level during a second portion of the time period, the first transmission power level greater than the time averaged threshold amount of radiation exposure, the second transmission power level less than the time averaged threshold amount of radiation exposure.

20. The non-transitory computer readable medium of claim 19, wherein the instructions cause the one or more processors to:
   increase a portion of the radio resources to allocate to a first communication interface of the at least one communication interface, to satisfy a first QoS of the first communication interface that is higher than a second QoS of a second communication interface of the at least one communication interface; and
   decrease a portion of the radio resources to allocate to the second communication interface.

* * * * *